Feb. 21, 1928.
W. W. HICKS
1,659,774
ELECTRIC HEATING DEVICE
Filed Jan. 5, 1925  3 Sheets-Sheet 1
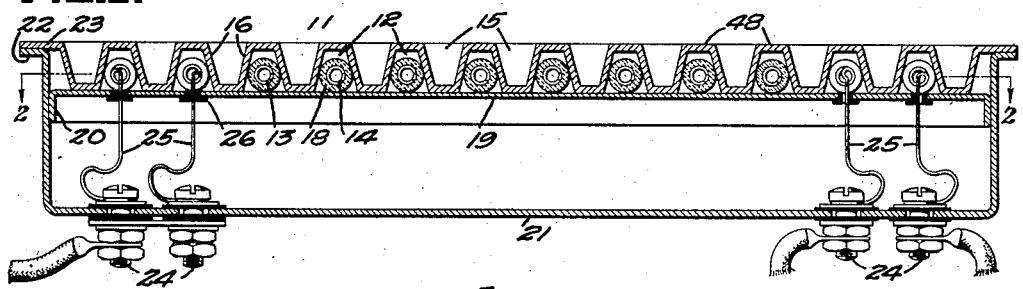
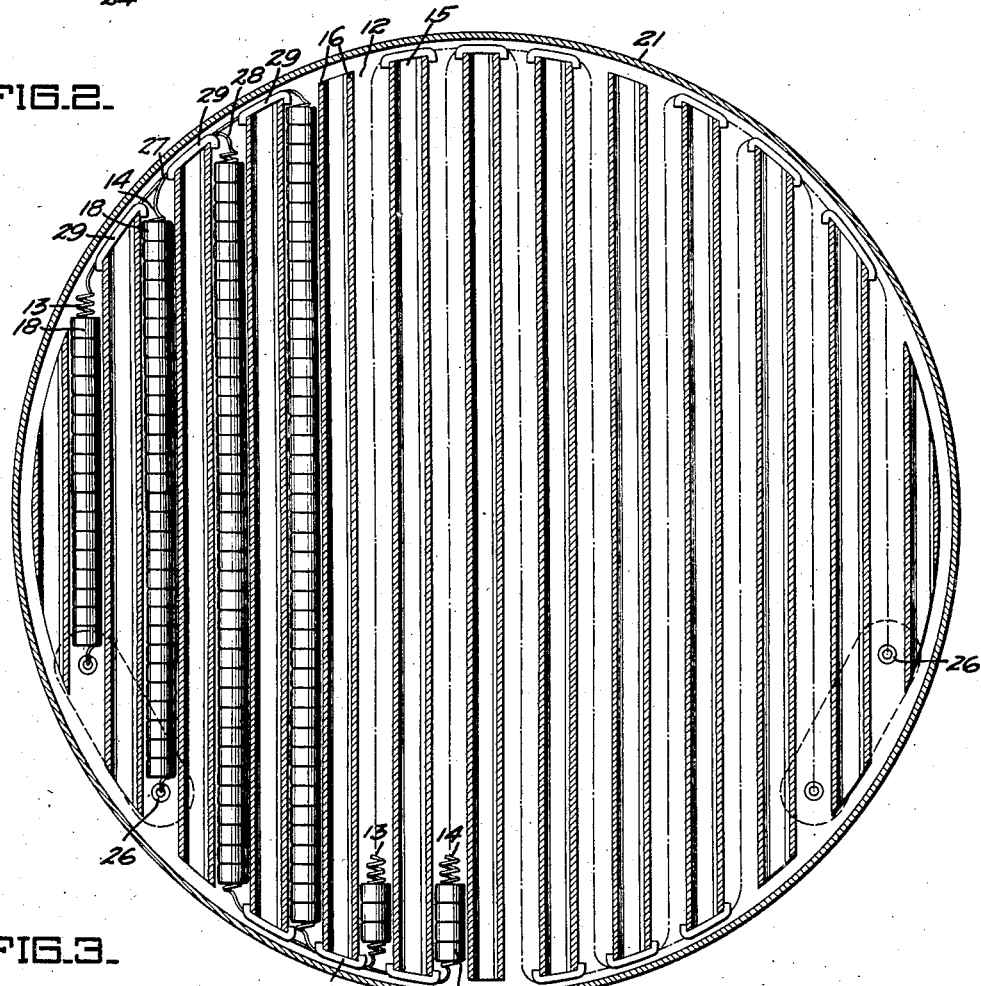
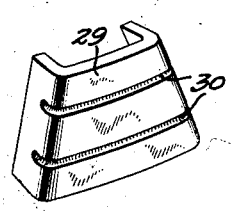
INVENTOR.
William Wesley Hicks
BY White Prost Evans
his ATTORNEYS.

Feb. 21, 1928.  
W. W. HICKS  
1,659,774  
ELECTRIC HEATING DEVICE  
Filed Jan. 5, 1925  
3 Sheets-Sheet 2

INVENTOR.  
William Wesley Hicks  
BY White Prost Evans  
his ATTORNEYS.

Feb. 21, 1928.

W. W. HICKS 1,659,774

ELECTRIC HEATING DEVICE

Filed Jan.5. 1925

INVENTOR.
William Wesley Hicks
BY *White Prost Evans*
his ATTORNEYS.

Patented Feb. 21, 1928.

1,659,774

UNITED STATES PATENT OFFICE.

WILLIAM WESLEY HICKS, OF SAN FRANCISCO, CALIFORNIA.

ELECTRIC HEATING DEVICE.

Application filed January 5, 1925. Serial No. 519.

This invention relates to a heater operated by electricity, and more particularly to a hot plate adapted to be used for cooking.

In such hot plates, it has been customary in the past to use a refractory support, of disc-like form, in which there are grooves serving to support the heating elements. Such an arrangement is somewhat objectionable, for an appreciable time is required for the refractory material to heat up to the desired temperature, when the elements are energized. In other words, the refractory support has a considerable heat capacity, and therefore a substantial heat lag results, from the time the circuit for the heating elements is completed. It is one of the objects of my invention to reduce this heat lag in such devices, whereby the hot plate is raised to its normal operating temperature in a much smaller period than has been possible heretofore.

Metal hot plates have also been used to some extent, but in all such metal plates, so far as I am aware, a considerable amount of metal is used, and the heat lag is not materially lessened. In the present instance, I overcome this disadvantage by forming the hot plate of thin metal, and I place the electrical heating element as close to the metal as possible, so as to be in as good heat conducting relation as possible. This effect is enhanced by forming the metal hot plate from corrugated material, in which the grooves formed by the corrugations accommodate the heating element.

The provision of the grooves is not necessarily confined to the under side of the hot plate, where they serve as guides for the heating element. Preferably the upper or cooking surface is also corrugated. This is highly important, for the reason that the greater the area of the hot plate which is used for cooking, the more quickly may heat be conducted away from the hot plate to any object to which heat is to be imparted.

It is still another object of my invention to improve in general hot plates of the character described.

It is still another object of my invention to make it possible to manufacture such hot plates at comparatively small cost.

It is still another object of my invention to provide a hot plate in which a heating surface of comparatively large extent is provided by the aid of corrugations or grooves, said corrugations or grooves having roughened surfaces to enhance this effect.

My invention possesses other advantageous features, some of which with the foregoing, will be set forth at length in the following description, where I shall outline in full, those forms of my invention which I have selected for illustration in the drawings accompanying and forming part of the present specification. Although I have shown in the present instance only a few embodiments of my invention, I do not desire to be limited thereto, since the invention as defined in the claims may be embodied in other forms also.

Referring to the drawings:

Figure 1 is a sectional view of one embodiment of my invention;

Fig. 2 is a sectional view, taken along plane 2—2 of Fig. 1;

Fig. 3 is a perspective view of one of the insulating saddles used in connection with the modification shown in Figs. 1 and 2;

Figure 4:
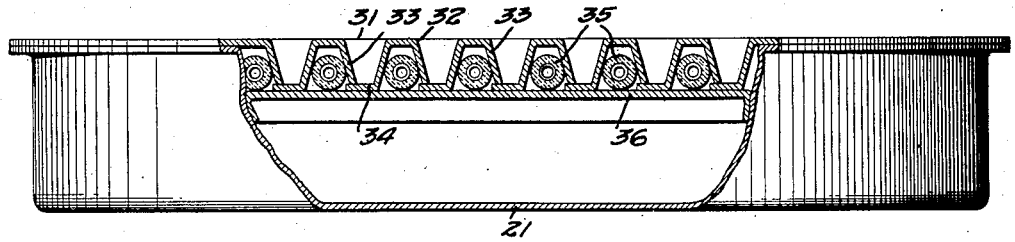
Fig. 4 is a side view, partly in section, of a modified form of my invention.

The modification illustrated in Figs. 1, 2 and 3 includes a metallic top plate 11, which is corrugated so as to form grooves or guides 12 for the heating elements 13 and 14, and to form corresponding grooves 15 in the upper surface of the plate 11. In the present instance, the grooves 12 are all parallel, and have converging walls 16, as well as plane top surfaces 48 upon which a cooking vessel may rest.

One of the important features of my invention resides in the fact that the heating elements 13 and 14 lie as closely to the top surface of the plate 11 as possible. In the present instance, these elements, being disposed in the grooves 12, are separated only by the thickness of wall 16 from the upper surface of the plate 11. The heating elements 13 and 14 are shown as made up of helical coiled wires, over which insulating beads 18 of refractory material are threaded. This type of heating element is disclosed and claimed in a co-pending application, filed in my name on October 11, 1924, entitled "Electrical heating element" and having Serial No. 743,061. The beads 18 serve efficiently to insulate the elements from the metallic wall 16 of the plate 11.

In order to hold the elements 13 and 14 in place in the groove 12, a retaining plate 19 is used, having a depending flange 20 arranged to be appropriately fastened to the cover member 21. This cover member also has a flange 22 cooperating with a flange 23 formed on plate 11, for holding the plate 11 in place. The electrical connections to the two heating elements 13 and 14 are provided by the aid of a plurality of binding posts 24, which are supported upon, but insulated from, the bottom of the cover 21. The leads 25 from the terminals of the heating elements 13 and 14 pass through insulating bushings 26 disposed in the retaining plate 19.

As thus far described, it is evident that the metallic parts which must be heated by the heating elements 13 and 14, have a comparatively small heat lag and therefore only a short period of time is required to bring the plate to operating temperature. This effect is enhanced by the fact that a comparatively small amount of metal is used in the hot plate. Another important feature is the fact that the heating surface is increased by the aid of the grooves 15. A quick transfer of heat is therefore possible from this external surface to any cooking utensil or the like which may be disposed on the hot plate 11. The metallic material from which the plate 11 may be made can be chosen to comply with the necessary requirements. Sheet aluminum is perhaps as readily usable as any other material; although of course iron, steel, or other alloys may also be used if desired.

A plurality of elements 13 and 14 is used in preference to a single one, so as to permit variations in the connection of these elements, and thereby to vary the amount of heat generated by the heating elements. The heating elements 13 and 14 have coiled portions connected by the straight wire connections, such as 27 and 28. The coiled portions of each of the two heating elements are disposed in alternate grooves 12 of the plate 11, the connections 27 and 28 serving to bridge the circuit for each element from groove to groove. The connections 27 and 28 must of course pass around the ends of the walls 16 forming the grooves 12. In order to keep these connections insulated from the walls, I provide an insulating saddle 29, shown in greater detail in Fig. 3. This saddle may be made of any appropriate insulating material, and is provided with a pair of grooves 30, serving as guides for the connections 27 and 28. Furthermore, the heating elements 13 and 14 may be readily replaced, by lifting up the plate 11 after it is disconnected from the cover member 21. The use of the beads 18 for providing the insulation over the coils of the heating element makes it possible to convolute the elements in any desired manner.

Of course the space between the cover 21 and the retaining member 19 may be filled with insulating material if desired; for the sake of clearness, such filling is omitted from the drawings.

The form of the hot plate may be varied to conform with the requirements. For example, the modification illustrated in Fig. 4 shows a hot plate 31 made up of a series of overlapping grooved members 32. Each of these grooved members 32 has a flat top surface, and a pair of depending legs 33 forming the walls of the grooves. Extending from one of the legs is the horizontal extension 34, adapted to be placed underneath the adjacent leg 33 of the succeeding member 32. The heating elements 35 are spaced in the grooves formed by the legs 33, and are held in place as before, by the aid of a retaining member 36.

In the construction disclosed in Fig. 4, comparatively small strips of sheet metal may be used for the stamping to make the parts 32. The dies for so stamping them are furthermore comparatively inexpensive.

Figure 5:
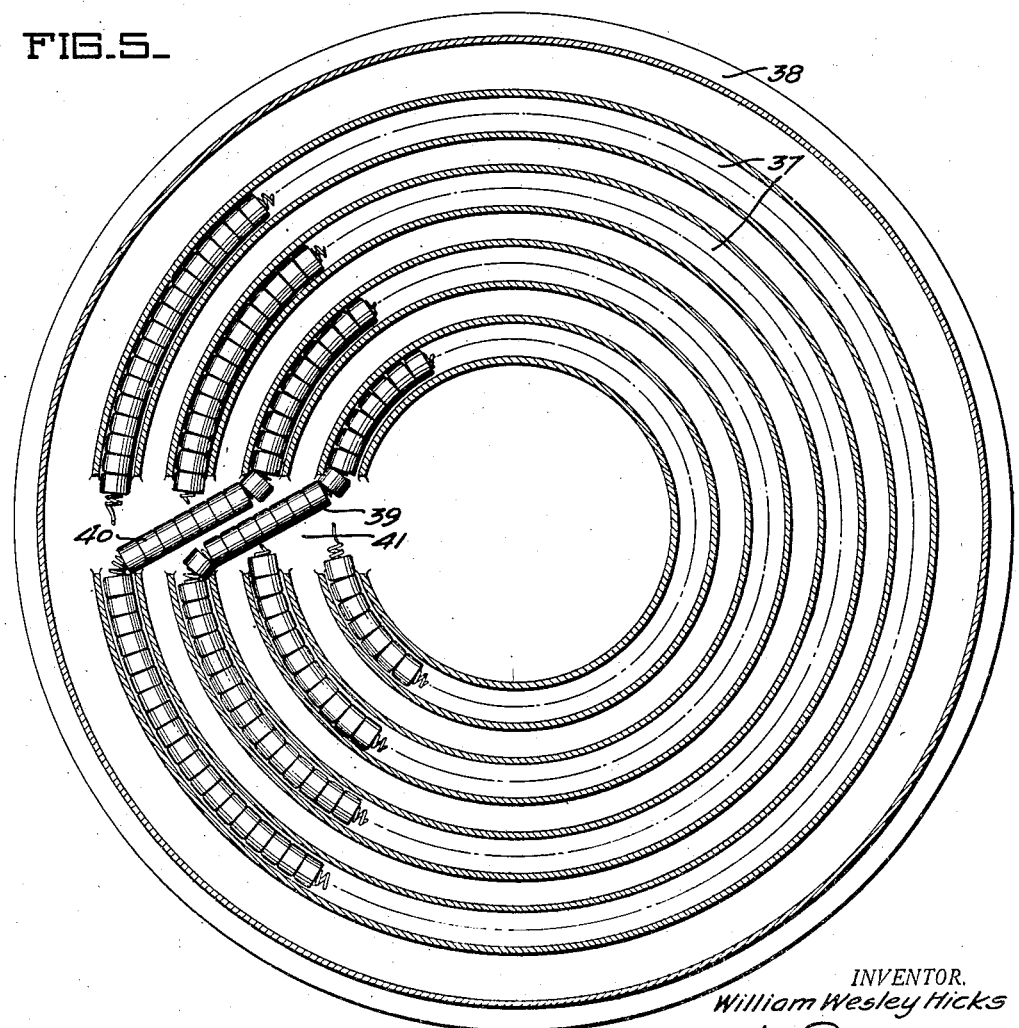
Fig. 5 is a bottom plan view, partly in section of still another form of my invention.

It is not essential to have the heating elements disposed in parallel grooves. Another way in which the elements may be arranged is disclosed in Fig. 5. In this instance, a series of annular grooves 37 is provided, located on the bottom surface of the hot plate 38. In order to permit the heating elements 39 and 40 to pass from one groove to another, I provide a passageway 41, which intersects all of the grooves 37 and which is wide enough to permit the heating elements 39 and 40 to pass slantwise between the grooves. Such circular grooves are much easier to produce than the usual form of spiral grooves, which are quite commonly provided in hot plates.

Figure 6:
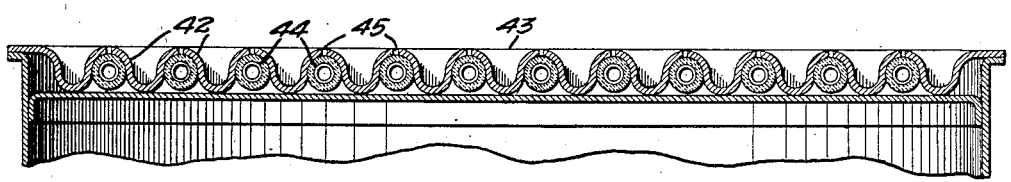
Fig. 6 is a sectional view of a still further modification of my invention.
Figure 7:
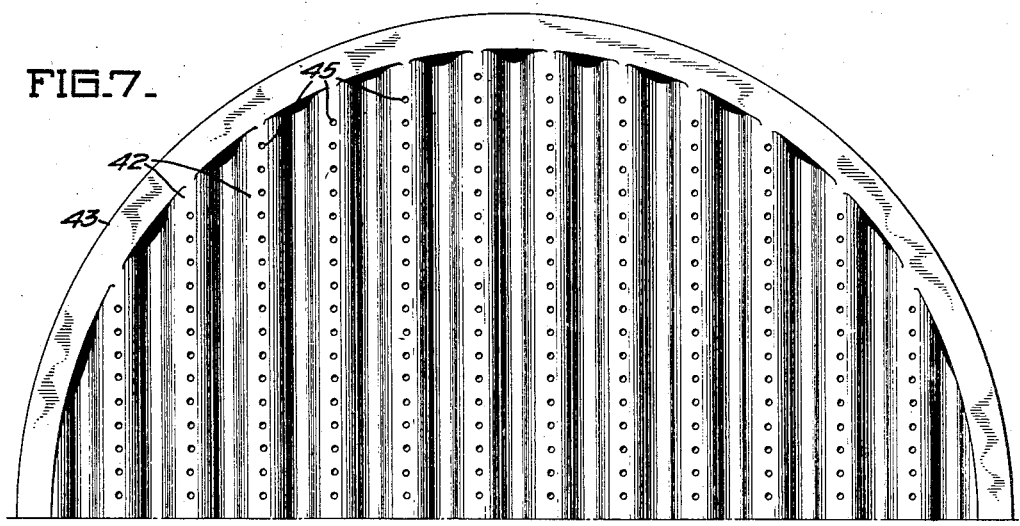
Fig. 7 is a fragmentary top plan view of the modification shown in Fig. 6.

The form of the walls and of the grooves in which the heating elements are accommodated may be varied from those already shown. For example, in Figs. 6 and 7 I disclose a curved form of groove, which may be more readily stamped from thin sheet metal to form corrugations 42 in hot plate 43. The grooves snugly engage a portion of the periphery of the heating elements 44. Another variation illustrated in this embodiment is represented by the provision of the series of apertures 45 in the crests of the corrugations. These apertures permit a direct radiation of heat from the heating elements, and since these elements are immediately below the apertures 45, an appreciable amount of radiation is obtained.

Figure 8:
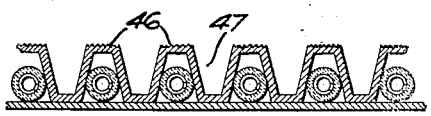
Fig. 8 is a detail sectional view of a still further modification.

The corrugations of course are useful primarily for increasing the heated area of the hot plate. This effect may be still further enhanced by the scheme illustrated in Fig. 8. In this case the top surface 46 of the hot plate 47 is shown as provided with a series of fine serrations. This further increases the effective area of the plate, as is self-evident, and these corrugations may be appropriately formed simultaneously with the main corrugations.

By the aid of my invention, the manufacture of an efficient and durable hot plate is rendered extremely inexpensive. The coils of wire which make up the heating element may be of any standard form, and when covered with the insulating beads, they may be readily and quickly inserted into the grooves provided for them in the hot plate.

I claim:

1. In an electrical heating device, a metallic plate having walls forming a series of grooves arranged side by side, a pair of heating elements arranged to be passed through the grooves, the elements alternating therein, said elements being provided with connections from one groove to another, said connections passing around the ends of the walls forming the grooves, and means for insulating the connections from each other and from the walls, comprising grooved insulating saddles, each joining adjacent walls.

2. In an electrical heating device, a metallic plate formed of a series of overlapping grooved members, said members being formed of thin material and each including a portion extending under the wall of the adjacent groove.

3. In an electrical heating device, a plurality of sheet metal members, means for retaining said members in overlapping relationship, each member being bent whereby the assembly forms a plurality of elongated grooves, and insulated electrical resistance conductors associated with said members, the insulation of said conductors occupying certain of said grooves, said overlapping relationship permitting expansion of said members in a direction lateral to said grooves.

4. In an electrical heating device, a plurality of sheet metal members, means for retaining said members in overlapping relationship, each member being bent whereby the assembly forms a plurality of elongated grooves, and insulated electrical resistance conductors disposed in the grooves provided by said members, said overlapping relationship permitting expansion of said members in a direction lateral to said grooves.

5. In an electrical heating device, a plurality of elongated metal members, means for retaining said members in overlapping relationship whereby a relatively flat outer face is formed for contact with a medium to be heated, and electrical heating means disposed in close heat transferring relationship with the inner face formed by said members.

6. In an electrical heating device, a plurality of non-planar metal members, means for retaining said members in overlapping relationship whereby outer and inner faces are formed by the assembled members, and electrical heating means in close heat transferring relationship with the inner indented face.

7. In an electrical heating device, a plurality of elongated non-planar metal members, means for retaining said members in close side by side relationship whereby grooved outer and inner faces are formed by the assembled members, and insulated resistance conductors disposed adjacent the inner face, the insulation of said conductors occupying the spaces formed by the grooves upon the inner face.

In testimony whereof, I have hereunto set my hand.

WILLIAM WESLEY HICKS.